United States Patent
Park et al.

(10) Patent No.: US 9,045,056 B2
(45) Date of Patent: Jun. 2, 2015

(54) APPARATUS FOR CONTROLLING MOTOR SYSTEM OF ENVIRONMENT-FRIENDLY VEHICLE AND METHOD THEREOF

(71) Applicant: Hyundai Motor Company, Seoul (KR)

(72) Inventors: Hong Geuk Park, Asan-si (KR); Mu Shin Kwak, Osan-si (KR); Sung Kyu Kim, Bucheon-si (KR); Su Hyun Bae, Daegu (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/139,662

(22) Filed: Dec. 23, 2013

(65) Prior Publication Data

US 2015/0066268 A1    Mar. 5, 2015

(30) Foreign Application Priority Data

Aug. 30, 2013    (KR) .................. 10-2013-0104104

(51) Int. Cl.
    *B60L 15/20*          (2006.01)
(52) U.S. Cl.
    CPC ................... *B60L 15/2018* (2013.01)
(58) Field of Classification Search
    CPC .......... B60L 15/2018; B60L 2244/423; B60L 2240/12; B60L 3/003; B60L 2240/441; B60L 2240/443; B60L 2240/20; B60W 20/00; B60W 10/08; B60W 2710/083; B60W 2710/0666; B60W 2710/105
    USPC ......... 701/22, 54; 180/65.265, 65.285, 65.21, 180/65.23, 65.275, 65.28, 443, 65.56; 318/432, 801; 903/906; 363/55, 71; 323/282; 361/23
    See application file for complete search history.

(56) References Cited

U.S. PATENT DOCUMENTS

| | | | | |
|---|---|---|---|---|
| 6,046,553 | A   * | 4/2000 | Matsunaga et al. | 318/139 |
| 6,979,967 | B2 * | 12/2005 | Ho | 318/400.02 |
| 2011/0172869 | A1 | 7/2011 | Bell, Jr. et al. | |
| 2012/0109482 | A1 * | 5/2012 | Yoshii | 701/70 |
| 2013/0119904 | A1 * | 5/2013 | Li et al. | 318/400.14 |
| 2013/0184906 | A1 * | 7/2013 | Harper | 701/22 |

FOREIGN PATENT DOCUMENTS

| | | | |
|---|---|---|---|
| JP | 2007-267527 A | 10/2007 | |
| JP | 4062072 | * 3/2008 | ............... B60L 9/18 |
| JP | 2011-155794 A | 8/2011 | |
| KR | 10-2007-0065031 A | 6/2007 | |
| KR | 10-2011-0053092 A | 5/2011 | |
| KR | 10-2012-0063849 A | 6/2012 | |

* cited by examiner

*Primary Examiner* — Marthe Marc-Coleman
(74) *Attorney, Agent, or Firm* — McDermott Will & Emery LLP

(57) ABSTRACT

An apparatus for controlling a motor system of an environment-friendly vehicle includes a tilt angle sensor to measure a driving tilt angle of a vehicle; a hill hold determinator to calculate a real-time driving gradient of the vehicle in order to determine a hill hold situation based on tilt angle information from the tilt angle sensor; and a variable switching determination controller to calculate a command torque for a motor based on the real-time gradient calculated by the hill hold determinator and to determine a variable switching condition of an inverter based on the command torque, a motor speed and previous and current tilt angle information from the tilt angle sensor.

9 Claims, 1 Drawing Sheet

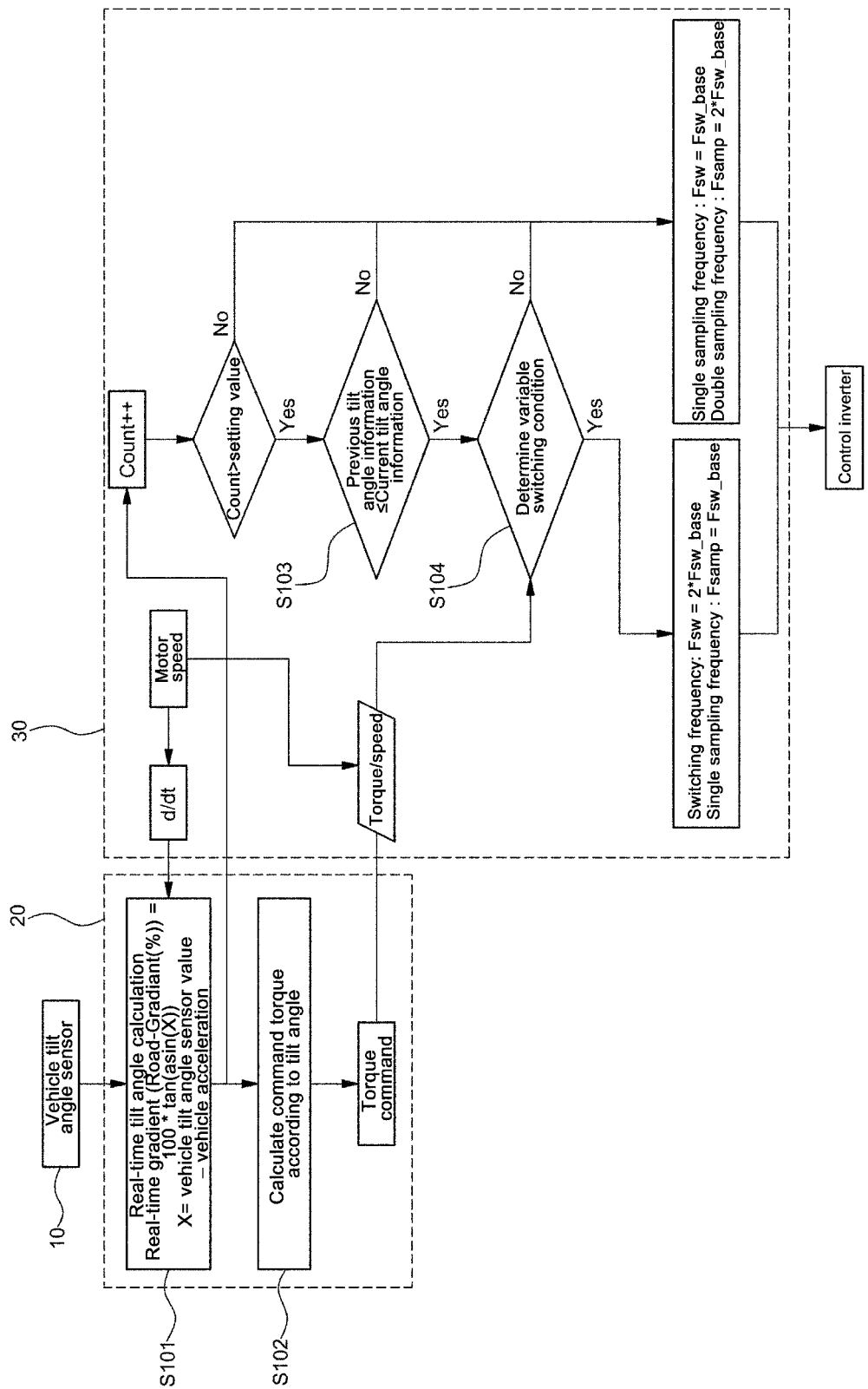

APPARATUS FOR CONTROLLING MOTOR SYSTEM OF ENVIRONMENT-FRIENDLY VEHICLE AND METHOD THEREOF

CROSS-REFERENCE TO RELATED APPLICATION

This application claims under 35 U.S.C. §119(a) the benefit of priority to Korean Patent Application No. 10-2013-01 04104 filed Aug. 30, 2013, the entire contents of which are incorporated herein by reference.

TECHNICAL FIELD

The present disclosure relates to an apparatus for controlling a motor system of an environment-friendly vehicle and a method thereof, and more particularly, to an apparatus for controlling a motor system of an environment-friendly vehicle capable of exactly determining a variable switching condition by detecting a hill hold situation based on information about a driving slope angle, and a method thereof.

BACKGROUND

An environment-friendly vehicle, such as a pure electric vehicle (EV), a hybrid electric vehicle (HEV) and a fuel cell vehicle (FCEV), which does not exhaust any gas at all, is driven by converting DC power charged in a main battery into 3-phase AC power a motor using an inverter to operate a motor and then, transferring the driving force of the motor to driving wheels.

In a motor system including a motor and an inverter installed in an environment-friendly vehicle, it has been known that the noise is reduced when a switching frequency of the inverter increases and the inverter efficiency and the fuel efficiency are enhanced when the switching frequency is decreased.

A single sampling scheme may be applied for reducing an inverter noise sensitively felt by a driver or a passenger. According to the single sampling scheme, a sampling frequency for obtaining information about a sensing current and a motor angle to control the inverter is set to be equal to the switching frequency of the inverter after the switching frequency is set high and fixed at it.

Although Noise, Vibration and Harshness (NVH) performance is improved when a base switching frequency is set high and fixed in all driving modes to reduce an inverter noise, the switching loss is increased and the inverter efficiency is deteriorated.

Thus, taking into consideration NVH performance, EMC performance, an inverter switching loss and control stability, a need exists to control the inverter switching frequency and the sampling frequency through a variable switching in a state that an environment-friendly vehicle is in a hill hold situation.

Unlike the environment-friendly vehicle, since an idle torque of an engine is transferred to a torque converter and a transmission even in the state that an accelerator pedal and a brake pedal of a vehicle are released to maintain the vehicle in a low-speed state, the vehicle may easily move on an inclined road such as a hill, so that the vehicle may be prevented from rolling backward in a hill hold situation.

In contrast, a hill hold function, which prevents a vehicle from rolling backward on an ascent road, may be implemented because an inverter controls the torque of a driving motor in an environment-friendly vehicle.

A method of determining whether an environment-friendly vehicle is in a hill hold section will be described as follows.

According to the related art, since three variables, i.e., a command torque, a driving motor speed and output information, for a motor are utilized for determining a hill hold section, after a hill hold condition is set for the three variables, values of the three variables are inputted to the condition to determine whether the vehicle is in a hill hold section.

Further, according to the related art, in order to prevent a vehicle from rolling backward and improve NVH performance of a vehicle for a switching noise of an inverter, the inverter does not operate at a base switching frequency, but performs a variable switching operation.

The inverter switching frequency is controlled through the variable switching operation to be higher than the base switching frequency, such that the switching noise sensitively felt by a driver and a passenger may be reduced.

In addition, the number of sampling, which is a control variable (current of a driving motor) for controlling a motor, is maintained corresponding to that in a base frequency band, so that the control accuracy is also maintained similarly to the base switching frequency control.

However, the related art has the following problems in the method of determining a hill hold section.

As described above, since the variables, such as the command torque, the driving motor speed and output information are utilized for determining a hill hold section in the related art, variable values may be inputted to the input condition of the variables for determining a hill hold condition even though the vehicle is not in a hill hold section.

That is, since the method of determining a hill hold section according to the related art is not accurate, variable values may be inputted to the input condition of the variables for determining a hill hold condition even though the vehicle is not in a hill hold section.

Thus, even though a vehicle is not in a hill hold section, the variable switching operation is performed so that the switching frequency increases. As the switching frequency increases, the inverter switching loss occurs and at the same time, the inverter switching efficiency is deteriorated.

SUMMARY OF THE DISCLOSURE

The present disclosure provides an apparatus for controlling a motor system of an environment-friendly vehicle which is capable of determining a variable switching condition of an inverter based on a command torque and information from the tilt angle sensor before applying the calculation result of the command torque for a motor to a driving motor after exactly determining a hill hold section using a tilt angle sensor of a vehicle, so that a vehicle sip phenomenon and an inverter switching loss may be prevented while a vehicle is climbing up on an inclined road, and a method thereof.

In order to achieve the above object, an apparatus for controlling a motor system of an environment-friendly vehicle according to the present disclosure includes a tilt angle sensor to measure a driving tilt angle of a vehicle; a hill hold determinator to calculate a real-time driving gradient of the vehicle in order to determine a hill hold situation based on tilt angle information from the tilt angle sensor; and a variable switching determination controller to calculate a command torque for a motor based on the real-time gradient calculated by the hill hold determinator and to determine a variable switching condition of an inverter based on the command torque, a motor speed and previous and current tilt angle information from the tilt angle sensor.

According to another embodiment of the present disclosure a method of controlling a motor system of an environment-friendly vehicle includes detecting information about a driving tilt angle; calculating a real-time gradient of a vehicle based on the driving tilt angle and a motor speed from a motor speed sensor; obtaining a motor command torque corresponding to a current tilt angle by applying the real-time gradient to a real-time gradient-torque map; determining a variable switching condition of an inverter when a tilt angle based on information about a current tilt angle is equal to or greater than a tilt angle based on information about a previous tilt angle; and performing a variable switching operation of the inverter when the variable switching condition is satisfied.

Accordingly, the present invention has the following advantages.

According to the present disclosure, the tilt angle sensor is used for determining whether the environment-friendly vehicle is being driven in the hill hold section, and the variable switching condition of the inverter may be exactly decided by using the command torque for the motor, the rotation speed of the motor and information from the tilt angle sensor of the vehicle.

That is, when the vehicle is not in the hill hold situation, the inverter may be set to be prohibited from performing the variable switching by exactly deciding the variable switching condition for the vehicle, so that the inverter switching loss may be reduced.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 1 shows a an apparatus for controlling a motor system of an environment-friendly vehicle and a method thereof according to an embodiment of the present disclosure.

It should be understood that the appended drawings are not necessarily to scale, presenting a somewhat simplified representation of various preferred features illustrative of the basic principles of the invention. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, the present disclosure will be described in detail with reference to the accompanying drawings.

The present disclosure, which relates to a technique for controlling a motor system of an environment-friendly vehicle including a motor and an inverter, decides a variable switching condition of the inverter based on a command torque for the motor and information from a tilt angle sensor after exactly determining whether the vehicle is being driven in a hill hold section by using the tilt angle sensor. The vehicle may be prevented from rolling backward and the inverter switching loss may be prevented while the vehicle is moving on an ascent road.

To this end, as shown in FIG. 1, the apparatus for controlling a motor system according to an embodiment of the present disclosure includes a tilt angle sensor 10 configured to measure a driving tilt angle of a vehicle, a hill hold determinator 20 configured to calculate a real-time driving gradient of the vehicle in order to determine a hill hold situation based on tilt angle information from the tilt angle sensor 10, and a variable switching determination controller 30 configured to calculate a command torque for a motor based on the real-time gradient calculated by the hill hold determinator 20 and to determine a variable switching condition of an inverter based on the command torque, a motor speed and previous and current tilt angle information from the tilt angle sensor 10.

Hereinafter a method of controlling a motor system of an environment-friendly vehicle will be described with reference to FIG. 1.

First, the tilt angle sensor 10 installed in the environment-friendly vehicle detects information about a driving tilt angle.

In step S101, The hill hold determinator 200 determines whether the vehicle is in the hill hold section by calculating a real-time gradient based on a driving tilt angle from the tilt angle sensor 10 and a motor speed from the motor speed sensor according to following Equation 1:

$$\text{Real-time gradient(Road-Gradiant(\%))} = 100 * \tan(a\sin(X)), \quad \text{[Equation 1]}$$

Where X is a sensing value measured by the tilt angle sensor 10, that is, a value that is obtained by subtracting the acceleration obtained by differentiating the motor speed from the driving tilt angle information.

Then, in step S102, when the real-time tilt angle is calculated, a motor torque value, that is, a motor command torque is extracted according to a current tilt angle through a real-time tilt angle-torque map.

In this case, before the motor command torque is applied to the driving motor through the inverter, a vehicle control microcomputer, that is, the variable switching determination controller 30 counts the tilt angle information calculated as described above and compares previous tilt angle information with current tilt angle information in step S103.

As a result of the comparison between the current tilt angle information and the previous tilt angle information, if the tilt angle from the current tilt angle information is equal to or greater than the tilt angle from the previous tilt angle information, step S104 of determining the variable switching condition for the inverter is performed.

The determining of the variable switching condition, that determines whether the inverter is in the variable switching condition or not, is performed by using the motor command torque Te or power according to the current tilt angle and the motor speed Wrpm.

The variable switching condition determination is performed in both cases in which the motor is driven for movement and the motor is driven for regenerative braking. The reason for performing the variable switching condition determination is because the maximum and minimum reference values of the motor command torque and speed are applied differently from each other.

When the motor is driven for movement, the inverter performs the variable switching operation if following conditional inequality is satisfied:

$$(\text{Wrpm\_cal1} | \text{Wrpm} | \text{Wrpm\_cal2}) \& (|\text{Te\_ref}| < \text{Te\_cal1})$$
$$\text{or} (|\text{Power}| < \text{Power\_cal1}),$$

Where Wrpm is a motor speed, Wrpm_cal1 is a motor speed minimum reference value, Wrpm_cal2 is a motor speed maximum reference value, Te_cal1 is a motor torque reference value, Te_ref is a motor command torque, Power_cal1 is a motor output reference value, and Power is a motor output.

To the contrary, in the regenerative braking, the inverter performs the variable switching operation if following conditional inequality is satisfied:

$$(\text{Wrpm\_cal3} \le |\text{Wrpm}| \le \text{Wrpm\_cal4}) \& \\ (|\text{Te\_ref}| < \text{Te\_cal2}) \text{ or } (|\text{Power}| < \text{Power\_cal2}),$$

Where Wrpm is a motor speed, Wrpm_cal3 is a motor speed minimum reference value, Wrpm_cal4 is a motor speed maximum reference value, Te_cal2 is a motor torque reference value, Te_ref is a motor command torque, Power_cal2 is a motor output reference value, and Power is a motor output.

As describe above, when the conditional inequalities are satisfied, the inverter performs the variable switching operation, so that the switching frequency is adjusted higher than the base switching frequency, so the inverter is controlled at the single sampling frequency.

To the contrary, if the conditional inequalities are not satisfied, the inverter maintains the base switching frequency so that the inverter is controlled at the double sampling frequency.

In this case, the base frequency, which is a frequency for switching between the single sampling (Fsamp=Fsw) and the double sampling (Fsamp=2×Fsw), is predetermined through a prior test of the motor system having the same specification.

For reference, the sampling frequency Fsamp varies with the switching frequency Fsw determined by the motor speed Wrpm. If the conditional inequality is not satisfied, the inverter is controlled in the double sampling mode (Fsamp=2×Fsw_base) in which the sampling frequency is twice the switching frequency.

To the contrary, when the switching frequency is adjusted higher than the base switching frequency, the sampling frequency is equal to the switching frequency. The inverter is controlled in the single sampling mode (Fsamp=Fsw_base) in which the switching frequency is used as the sampling frequency.

As described above, while the environment-friendly vehicle is being driven, the present disclosure may exactly determine that the environment-friendly vehicle is in the hill hold section by using the tilt angle sensor and in addition, may exactly decide the variable switching condition of the inverter by using the command torque for the motor, the rotation speed of the motor and information from the tilt angle sensor of the vehicle. Thus, when it is not in the hill hold situation, the inverter may be prevented from performing the variable switching operation, so that the switching loss of the inverter may be reduced.

What is claimed is:

1. An apparatus for controlling a motor system of an environment-friendly vehicle, the apparatus comprising:
    a tilt angle sensor to measure a driving tilt angle of a vehicle;
    a hill hold determinator to calculate a real-time driving gradient of the vehicle in order to determine a hill hold situation based on tilt angle information from the tilt angle sensor; and
    a variable switching determination controller to calculate a command torque for a motor based on the real-time gradient calculated by the hill hold determinator and to determine a variable switching condition of an inverter based on the command torque, a motor speed and previous and current tilt angle information from the tilt angle sensor when a tilt angle based on information about the current tilt angle is equal to or greater than a tilt angle based on information about the previous tilt angle,
    wherein the inverter is controlled by a variable switching operation of the inverter that changes a switching frequency and a sampling frequency of the inverter, when the variable switching condition is satisfied.

2. A method of controlling a motor system of an environment-friendly vehicle, the method comprising:
    detecting information about a driving tilt angle;
    calculating a real-time gradient of a vehicle based on the driving tilt angle and a motor speed from a motor speed sensor;
    obtaining a motor command torque corresponding to a current tilt angle by applying the real-time gradient to a real-time gradient-torque map;
    determining a variable switching condition of an inverter when a tilt angle based on information about a current tilt angle is equal to or greater than a tilt angle based on information about a previous tilt angle; and
    performing a variable switching operation of the inverter that changes a switching frequency and a sampling frequency of the inverter, when the variable switching condition is satisfied.

3. The method of claim 2, wherein the determining of the variable switching condition is performed by distinguishing a case in which the motor is driven for moving from a case in which the motor is driven for regenerative braking.

4. The method of claim 3, wherein the variable switching operation of the motor is performed when the motor is driven for movement and a following conditional inequality is satisfied:

$$(\text{Wrpm\_cal1} \le |\text{Wrpm}| \le \text{Wrpm\_cal2}) \& \\ (|\text{Te\_ref}| < \text{Te\_cal1}) \text{ or } (|\text{Power}| < \text{Power\_cal1}),$$

wherein Wrpm is a motor speed, Wrpm_cal1 is a motor speed minimum reference value, Wrpm_cal2 is a motor speed maximum reference value, Te_cal1 is a motor torque reference value. Te_ref is a motor command torque, Power_cal1 is a motor output reference value, and Power is a motor output.

5. The method of claim 4, wherein, when the conditional inequality is satisfied, the switching frequency of the inverter is adjusted higher than a base switching frequency, such that the inverter is controlled at a single sampling frequency.

6. The method of claim 4, wherein, when the conditional inequality is not satisfied, the inverter is maintained at a base switching frequency, such that the inverter is controlled at a double sampling frequency.

7. The method of claim 3, wherein the variable switching operation of the motor is performed when the motor is driven for regenerative braking and a following conditional inequality is satisfied:

$$(\text{Wrpm\_cal3} \le |\text{Wrpm}| \le \text{Wrpm\_cal4}) \& \\ (|\text{Te\_ref}| < \text{Te\_cal2}) \text{ or } (|\text{Power}| < \text{Power\_cal2})$$

wherein Wrpm is a motor speed, Wrpm_cal3 is a motor speed minimum reference value. Wrpm_cal4 is a motor speed maximum reference value, Te_cal2 is a motor torque reference value, Te_ref is a motor command torque, Power_cal2 is a motor output reference value, and Power is a motor output.

8. The method of claim 7, wherein, when the conditional inequality is satisfied, the switching frequency of the inverter is adjusted higher than a base switching frequency, such that the inverter is controlled at a single sampling frequency.

9. The method of claim 7, wherein, when the conditional inequality is not satisfied, the inverter is maintained at a base switching frequency, such that the inverter is controlled at a double sampling frequency.

* * * * *